R. H. HASSLER.

SHOCK ABSORBER FOR VEHICLES.

APPLICATION FILED JULY 9, 1919.

Reissued Jan. 4, 1921.

15,018.

2 SHEETS—SHEET 1.

INVENTOR:
Robert H. Hassler,
By Frank W. Hoerner,
ATTORNEY.

R. H. HASSLER.

SHOCK ABSORBER FOR VEHICLES.

APPLICATION FILED JULY 9, 1919.

Reissued Jan. 4, 1921.

15,018.

2 SHEETS—SHEET 2.

INVENTOR:
Robert H. Hassler,
By Frank H. Kearney,
ATTORNEY.

UNITED STATES PATENT OFFICE.

ROBERT H. HASSLER, OF INDIANAPOLIS, INDIANA.

SHOCK-ABSORBER FOR VEHICLES.

15,018. Specification of Reissued Letters Patent. Reissued Jan. 4, 1921.

Original No. 1,286,614, dated December 3, 1918, Serial No. 164,351, filed April 25, 1917. Application for reissue filed July 9, 1919. Serial No. 309,747.

*To all whom it may concern:*

Be it known that I, ROBERT H. HASSLER, a citizen of the United States, residing at Indianapolis, in the county of Marion and State of Indiana, have invented certain new and useful Improvements in Shock-Absorbers for Vehicles, of which the following is a specification.

The object of this invention is to add the resiliency of a spiral spring with its capacity to absorb sharp rapid vibration, as an auxiliary to a vehicle leaf spring, and to accomplish this with simplicity, compactness and a minimum of wearing parts, accompanied by freedom from rattle and noise.

The further object is to limit the action of the spiral and leaf springs to a motion in a vertical plane without side sway.

I accomplish the above and other objects which will hereinafter appear, by the mechanism illustrated in the accompanying drawings, in which—

Figure 1:
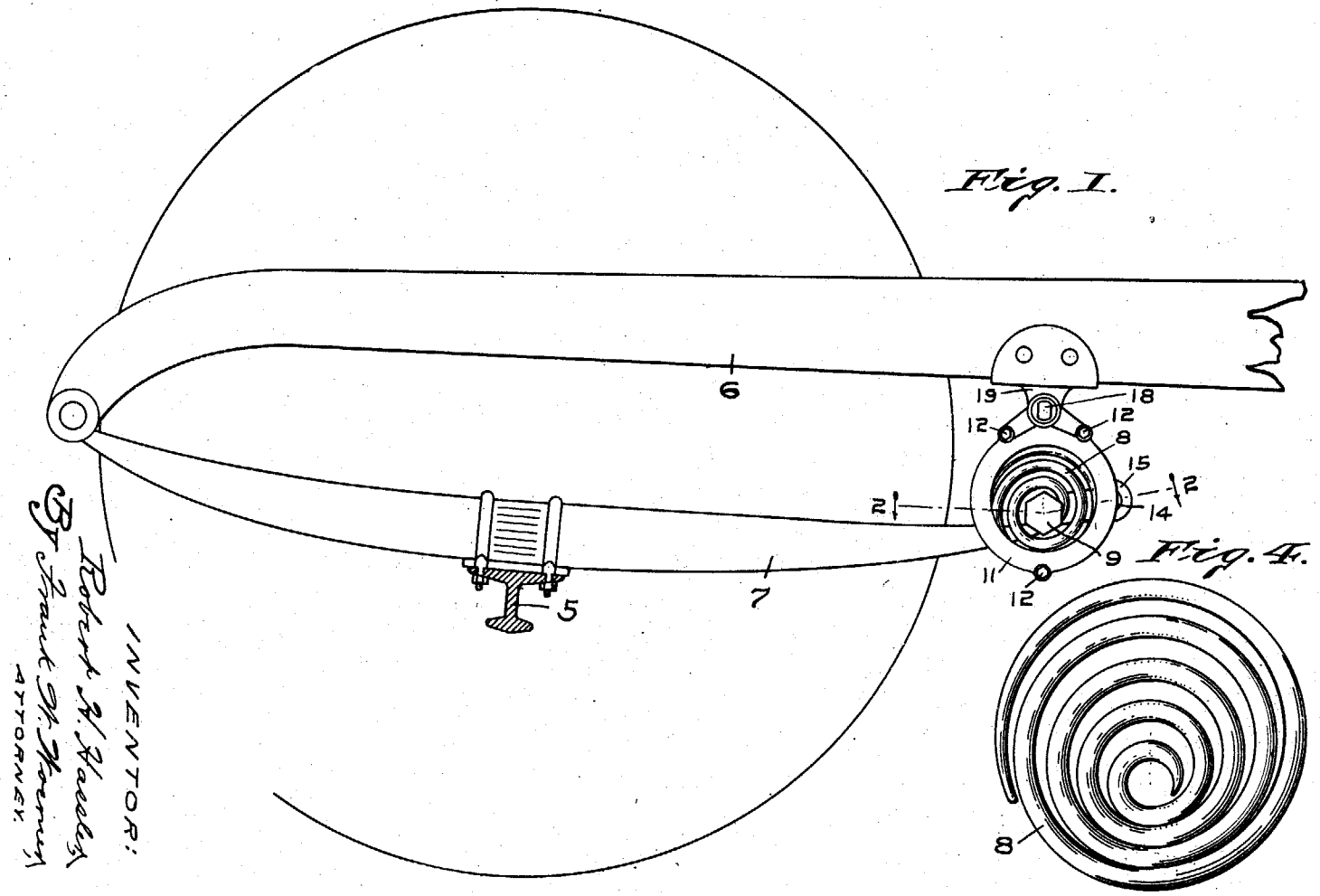
Figure 2:
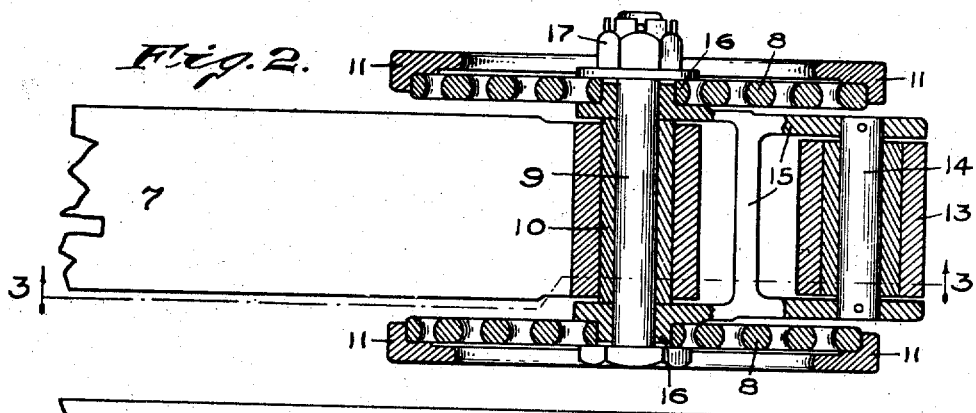
Figure 3:
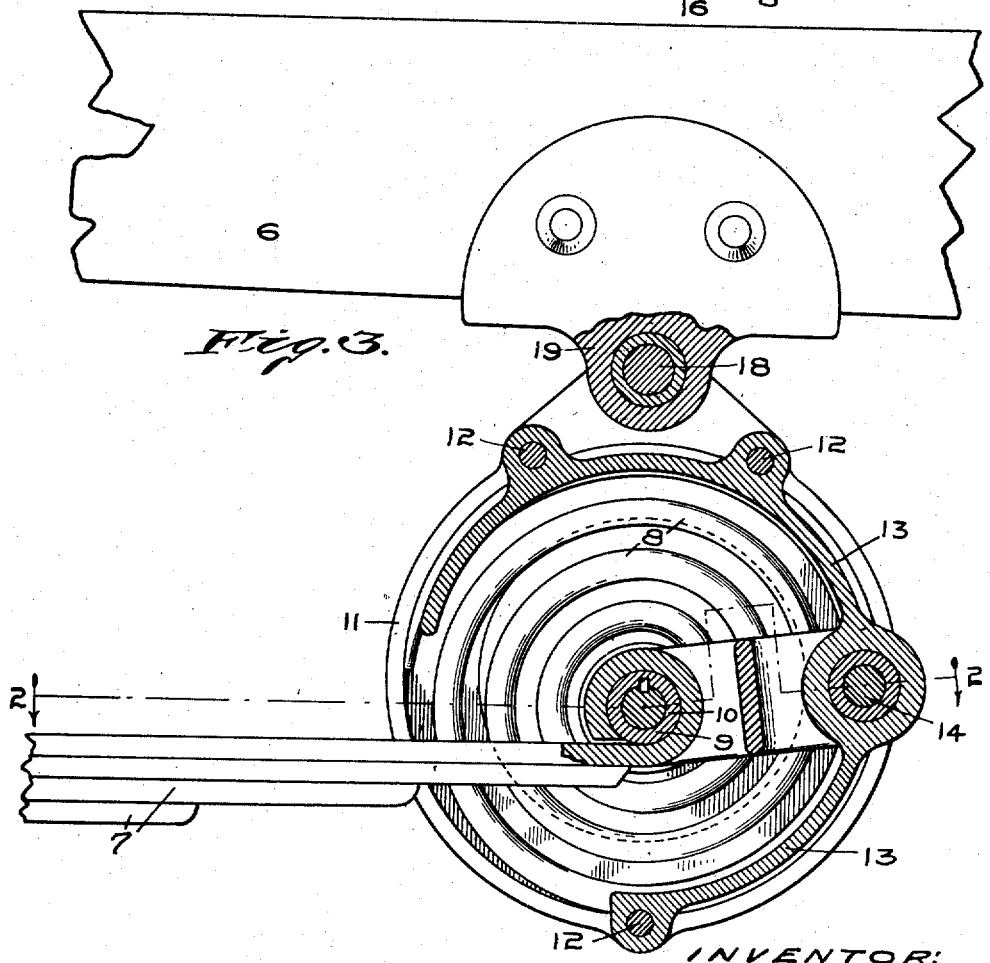

Figure 1 is a view in side elevation of an end of the main frame of an automobile or truck with my invention applied thereto. Fig. 2 is a section on the line 2—2 of Figs. 1 and 3. Fig. 3 is a vertical section on the line 3—3 of Fig. 2 and Fig. 4 is a separate view of the spiral spring.

Like characters of reference indicate like parts throughout the several views of the drawings.

Referring to the drawings, 5 is the front axle, 6 the main frame and 7 a leaf spring of usual construction pivotally connected with the frame at one end and clipped to the axle in the usual manner near its middle. The other end of the leaf spring is connected with the frame 6 through the instrumentality of my invention, the embodiment of which, as here shown, comprises a pair of spiral springs 8, through the inner convolutions of which passes a bolt 9, which also passes through the eye at the end of the leaf spring, but is separated from direct contact with the latter by a spacing sleeve 10, slightly longer than the width of the leaf spring at this part.

The spiral springs are assembled in their respective housings 11. The housings are connected by bolts 12, here shown as three in number, and a spacer 13, located between the housings, through which the bolts pass. A pin 14 is journaled in the spacer 13, and to its projecting ends an H-shaped link 15 is rigidly secured and therewith held in a manner to freely oscillate with the pin 14 as a fulcrum. Bosses 16 on the opposite stems of the link enter the inner convolutions of the springs 8, relieving the bolt 9 from direct bearing thereon of said inner convolutions. One end of the bolt 9 is headed and bears against the inner convolution of one spring 8, and the other end of the bolt is threaded to receive a nut 17, which bears against the outside of the inner convolution of the other spring 8, and, by the intervention of the spacing sleeve 10, the inner convolutions of both springs 8 are clamped to link 15 by the tightening of nut 17.

The housings 11 are pivoted to the frame 6 by means of a pin 18, journaled in a hanger 19, depending from the frame 6.

The elongation of the leaf spring 7, as it deflects, is taken care of through the pivot-action of the device as a whole on pin 18, and its journal in the bracket 19 on frame 6. A slight torsion takes place in spiral springs 8 as leaf spring 7 elongates, due to the inner convolution of spiral springs 8 being clamped endwise along bolt 9 and spacer 10, in the eye of leaf spring 7, by means of the nut 17 on the bolt 9.

This construction limits the wearing parts to journals on the pins 18 and 14, and to motion between spacer 10 and the inside of the eye of leaf spring 7.

The restriction of movement to a vertical plane of the leaf spring 7, and spiral springs 8, is secured through the H-shaped link 15, which yokes over the end of leaf spring 7 at its inner end, and over the pin 14 at the outer end, leaving link 15 free to oscillate vertically in its journal on the pin 14 in the spacer 13, and in journal on the spacer 10 in the leaf spring 7, so that spiral springs 8 and leaf springs 7 are unrestricted as to motion in a vertical plane by link 15, but are restrained from moving in any other plane.

To obtain the maximum resiliency and action in the spiral springs 8 they are wound eccentrically, as shown in Fig. 4, and are mounted in housings 11, whereby the load acts in a direction opposite to the eccentricity, and the springs have available for spring action all the clearance between the convolutions of the spiral on the side opposite to that upon which the load is imposed.

The device may be applied to either or both ends of any type of conventional vehicle leaf spring at front or rear, and may be secured thereto either in the manner specifically illustrated in the accompanying drawings, or in any other manner which will readily suggest itself to those skilled in the art. In general, the functional purposes and objects of my invention will be attained when one extremity of the spiral supplemental spring is attached directly or indirectly to the main spring, while the other extremity thereof is connected directly or indirectly to the opposing vehicle member—*i. e.* either the axle or the body portion (to which the main spring is ordinarily attached)—the idea being that in the application to the ordinary spring suspension, the device takes the place of regular shackle links, thus eliminating parts to offset those added.

In some cases it may also be desirable to use my invention either independently, or in parallel with a main spring suspension, in which case the inner end of the spiral spring and the housing which confines and incloses the outer periphery thereof, may be respectively attached directly to any two relatively movable members of the vehicle chassis—*e. g.* the axle and the body frame—so as to be stressed or flexed by the oscillatory movements thereof in the same manner as occurs when the device is interposed between the main spring and the opposing vehicle member.

Having thus fully described my invention what I claim as new and wish to secure by Letters Patent of the United States, is—

1. A shock absorber for vehicles, comprising a spiral spring, a rigid housing for inclosing and confining the said spring, a guide member connecting the housing and the central eye of the spring, and means for attaching the housing and the inner end of the spiral spring respectively to two relatively movable parts of the vehicle.

2. An auxiliary spring-check for automobiles, comprising a spiral spring member the eye of which is positioned approximately centrally of the spring under normal load, said eye having means of attachment to a vehicle, a caging member inclosing said spiral spring having means of attachment to another portion of the vehicle.

3. In a shock absorber for vehicles, a vehicle frame, a vehicle leaf-spring, a supplementary spiral spring, a supplementary spring retaining housing, means for eccentrically connecting the axis of the supplementary spring to said housing, said supplementary spring and its housing forming a flexible connection between the vehicle frame and vehicle leaf-spring.

4. In a shock absorber, a main spring, a spiral supplemental spring, a housing for inclosing and confining the said spiral spring, means for restricting the transverse movement of the central axis of the spiral spring, and means for connecting the inner and outer coils of the spiral spring to two relatively movable members of the vehicle chassis.

5. In a shock absorber for vehicles, a main spring, a supplemental spring pivotally connected thereto at one of its extremities, a housing for confining the periphery of said supplemental spring and capable of lateral oscillation with respect thereto, and means for pivotally connecting said housing to that portion of the vehicle to which the main spring is ordinarily attached.

6. In a shock absorber, a main spring, a supplemental spring, means for connecting one extremity of the supplemental spring to one of the chassis members of the vehicle, a housing for confining the supplemental spring and capable of lateral oscillation with respect thereto, means for pivotally connecting said oscillating housing to the other chassis member of the vehicle, and means for pivotally connecting the periphery of the oscillating housing to the central portion of the supplemental spring.

7. In a shock absorber construction a supplemental spiral spring, arranged to cooperate with the main spring, a housing for inclosing and confining the outer periphery of the said supplemental spring, a guide member pivotally attached at one end to the housing and at the other end to the center of the spiral spring, and means for connecting the inner and outer coils of the spiral spring to two relatively movable members of the vehicle.

8. In a shock absorber, a leaf spring, a spiral spring pivoted at its axis to said leaf spring, an oscillating housing for confining said spiral spring, and means for pivotally connecting the axis of the spiral spring eccentrically with the oscillating housing.

9. In a shock absorber, a leaf spring, a spiral spring pivoted at its axis to said leaf spring, an oscillating housing for confining said spiral spring, an attaching element arranged eccentrically on said housing, and means for connecting the axis of the spiral spring with said connecting element.

10. In a shock absorber, a leaf spring, a spiral spring pivoted at its axis to said leaf spring, an oscillating housing, means on said housing to form a support for the circumferential surface of said spiral spring, and means for pivotally connecting the axis of the spiral spring eccentrically with said oscillating housing.

11. In a shock absorber, a leaf spring, a pair of spiral springs, means for connecting an end of the leaf spring to the inner convolutions of both spiral springs, and oscillatively supported housings in which the outer convolutions of the spiral springs are held.

12. In a shock absorber, a leaf spring, a pair of spiral springs, means for connecting an end of the leaf spring to the inner convolutions of both spiral springs, and oscillatively supported housings in which the outer convolutions of the spiral springs are held, said spiral springs being eccentrically wound and assembled with those parts of the coils down which are in closest relation to each other.

13. In a shock absorber, a leaf spring, a pair of spiral springs, means for connecting an end of the leaf spring to the inner convolutions of both spiral springs, a link connected with said means, oscillatively supported housings in which the outer convolutions of the spiral springs are held, and means for oscillatively supporting the link from the housings.

14. In a shock absorber, a leaf spring, a pair of spiral springs, means for connecting an end of the leaf spring to the inner convolutions of both spiral springs, a link connected with said means, oscillatively supported housings in which the outer convolutions of the spiral springs are held, a spacer between and secured to the housings and means for oscillatively supporting the link from the spacer.

In witness whereof, I have hereunto set my hand at Indianapolis, Indiana, this 23rd day of June, 1919.

ROBERT H. HASSLER.